2,932,607
PRODUCTION OF PENICILLIN

Gilbert Anderson, Heidelberg, Victoria, Leo James Davis, Murrumbeena, Victoria, and Vivian Frederick Davey, East Malvern, Victoria, Australia No Drawing. Application May 17, 1956
Serial No. 585,397

Claims priority, application Australia May 20, 1955

23 Claims. (Cl. 195—36)

This invention relates to the production of penicillin and refers particularly to a method of producing penicillin in which use is made of skimmed milk or similar milk product.

Milk products have not hitherto been found to be a satisfactory replacement for corn steep liquor in penicillin production.

In Journal of Bacteriology, 1946, vol. 51, p. 57, Moyer and Coghill state:

"Whole or skimmed milk has some value for penicillin formation, but probably not enough to merit commercial exploitation. Using 80% skimmed milk as the only nutrient in the medium, penicillin yields of 30 units per ml. were obtained." (Yields of 150 to 200 units per ml. were obtained by these authors on corn steep media.)

Florey et al. in "Antibiotics," 1949, vol. 2, p. 765, state:

"Many natural products such as vegetable juices, yeast extracts, molasses and whey have been tried as substitutes for corn steep in industrial production of penicillin, but none has been able to compete with corn steep in cheapness and efficiency, and up to the present time it has not been replaced by any other product."

Hastings, in the Industrial Chemist of October 1955, reviewing 10 years of penicillin manufacture, states:

"This corn steep liquor together with sugar, chiefly in the form of lactose, still forms the main industrial raw material for penicillin fermentation. Certain countries have to some extent succeeded in using indigenous raw materials, but not to any significant extent in terms of world production."

The object of this invention is to provide a method of manufacturing penicillin in which a milk product takes the place of corn steep liquor in the nutrient solution used for growing the mould.

A further object is to provide a method of producing higher yields of penicillin than have hitherto been obtainable by using a corn steep medium.

This invention comprises a process for the production of penicillin in which a penicillin producing mould is grown under submerged culture conditions in a fermentation medium in which the whole or part of the proteinaceous material is derived from skimmed milk or other similar milk product, and to which is added a further source of sulphur utilizable by the mould.

According to a feature of the invention, the fermentation medium may be inoculated with a seed culture grown on a medium which will support rapid and abundant growth of the mould. In particular, the seed culture used to inoculate the fermentation medium may be grown on a corn steep medium or on a medium based on dried skimmed milk. The seed culture may, however, be grown on other suitable media if desired.

Experiments have shown that, when certain conditions are fulfilled, yields of penicillin about 1.7 or more times as great as those obtained from corn steep medium, can be obtained from skimmed milk medium by submerged culture of a penicillin producing mould in shake flasks.

When the results from these experiments were tested in 30 litre stirred fermentors, the skimmed milk medium gave penicillin yields about 1.4 times as great as those from corn steep medium and when they were further tested in 5000 gallon fermentors, it was found that the skimmed milk medium gave yields of penicillin about 1.5 times as great as corn steep medium.

In the experiments which will now be described to illustrate the process of the invention, a culture of *Penicillium chrysogenum* Wis 49–133 was grown on 150 ml. quantities of medium in 500 ml. Erlenmeyer flasks. The flasks were inoculated with a mycelial seed culture and were incubated at 24° C. on a rotary shaking machine moving at 280 r.p.m. and describing a circle of 1½" diameter.

The composition of the standard corn steep medium used for purposes of comparison was as follows:

| | | |
|---|---|---|
| Corn steep liquor | percent (by volume) | 5.0 |
| Lactose | percent (grams/100 ml.) | 3.0 |
| $NaNO_3$ | do | 0.3 |
| $MgSO_4.7H_2O$ | do | 0.025 |
| $KH_2PO_4$ | do | 0.05 |
| $CaCO_3$ | do | 0.3 |
| Phenylacetamide | do | 0.1 |

This medium regularly gives penicillin yields of about 1200 units/ml. in shake flasks with the strain of mould used.

Using a fermentation medium based on skimmed milk instead of corn steep, the strain of mould gave penicillin yields of about 2000–2500 units/ml. under the following conditions:

(a) Use of a suitable concentration of skimmed milk or related product in the medium.
(b) Addition of an appropriate concentration of a suitable carbohydrate to the medium.
(c) Addition of a suitable utilizable source of sulphur to the medium.
(d) Addition of suitable amounts of one or more appropriate penicillin precursors to the medium.
(e) Use of a suitable inoculum for the fermentation medium.
(f) Addition as necessary of suitable concentrations of trace elements to the medium, especially of iron and copper.
(g) Addition as necessary of a metal chelating agent such as a salt of ethylene diamine tetracetic acid to the medium.

A procedure which gives yields of penicillin about 1.7 times as great as the standard corn steep medium is as follows:

For convenience of reference this procedure will be referred to hereinafter as the standard skimmed milk procedure and the fermentation medium used in it as the standard skimmed milk fermentation medium.

*Composition of standard skimmed milk fermentation medium*

| | (grams/100 ml.) |
|---|---|
| Dried skimmed milk (D.S.M.) | percent 3.0 |
| Lactose (additional to D.S.M.) | do 3.5 |
| $Na_2S_2O_3.5H_2O$ | do 0.1 |
| Phenylacetamide | do 0.1 |

The pH is unadjusted, being about 6.8 and 6.3 before and after autoclaving respectively.

Sodium phenyl acetate 0.1% is added during the fermentation.

Composition of corn steep seed medium

| | | |
|---|---|---|
| Corn steep liquor | percent (by volume) | 5.0 |
| Lactose | percent (grams/100 ml.) | 3.0 |
| Glucose | do | 1.0 |
| $NaNO_3$ | do | 0.3 |
| $MgSO_4 \cdot 7H_2O$ | do | 0.025 |
| $KH_2PO_4$ | do | 0.05 |
| $CaCO_3$ | do | 0.3 |

The seed medium is inoculated with spores of the mould and incubated at 24° C. on a rotary shaker for 2 days. The fermentation medium is inoculated with one fifteenth of its own volume of seed culture.

Over a series of experiments in which penicillin production was compared in standard corn steep medium and in the standard skimmed milk procedure, penicillin yields were obtained as follows:

Standard skimmed milk procedure—2090 units/ml. (average of 13 runs)
Standard corn steep medium—1220 units/ml. (average of 8 runs)
Ratio of yields skimmed milk/corn steep—1.71

The penicillin produced in the skimmed milk medium by the standard skimmed milk procedure was found by chromatographic analysis to have a content of benzyl penicillin averaging 98% over a series of 6 runs compared with 96% for the penicillin from corn steep medium.

Lactose is a suitable source of carbohydrate for penicillin production in skimmed milk medium but the lactose requirement is higher than in corn steep medium. Although satisfactory penicillin yields are obtained over a range of concentrations of skimmed milk and lactose, the highest yields are obtained by using about 3% dried skimmed milk and a total lactose concentration of about 5%, i.e. 3% dried skimmed milk and 3.5% additional lactose.

Variation of the standard skimmed milk fermentation medium with respect to the concentration of dried skimmed milk (D.S.M.) and lactose gave the following results from an average of 5 experiments.

| D.S.M. Conc., Percent | Total Lactose, Percent | Penicillin Yield, Pure Lactose | units/ml. Crude Lactose |
|---|---|---|---|
| 2.0 | 4.0 | 1,690 | 1,930 |
| 2.0 | 5.0 | 1,710 | 1,930 |
| 2.5 | 4.0 | 1,950 | 1,990 |
| 2.5 | 5.0 | 1,990 | 2,050 |
| 3.0 | 4.0 | 2,160 | 2,060 |
| 3.0 | 5.0 | 2,150 | 2,170 |

For regular penicillin production, dried skimmed milk is a very convenient material from the point of view of constancy of composition, transport and storage and most of the work here described has been done with this material. Samples of dried skimmed milk from a number of manufacturers, including spray dried and drum dried material, have been compared for penicillin production by the standard procedure and no significant differences were found between the samples tested.

Generally, dried skimmed milk is much more uniform in composition than corn steep and accordingly gives more regularly reproducible yields which is an advantage in plant production and makes the process more economical to operate.

Ordinary skimmed milk from a single producer was compared with dried skimmed milk over a range of concentrations. The average of the results from 3 runs showed that the ordinary skimmed milk gave yields of penicillin lower by 5 to 10% than the corresponding concentration of dried skimmed milk.

The results from this comparison were as follows:

| Conc. of Milk Corresponding to D.S.M. | D.S.M. | Penicillin Yield, units/ml. Skimmed Milk |
|---|---|---|
| 2.0% | 2,050 | 1,770 |
| 2.5% | 2,250 | 1,990 |
| 3.0% | 2,290 | 2,120 |
| 4.0% | 1,870 | 1,730 |

These results show that, under appropriate conditions, ordinary skimmed milk can be used for penicillin production and will give yields much higher than those from corn steep medium.

Dried buttermilk (D.B.M.) from 2 sources was compared with dried skimmed milk for penicillin production at various concentrations in the standard procedure. The two samples gave penicillin yields which differed considerably but both gave yields much higher than those from corn steep medium.

The yields obtained in these comparisons were as follows:

| Conc. percent of Dried Milk | Penicillin Yield, units/ml. | | | |
|---|---|---|---|---|
| | D.S.M. | D.B.M.(a) | D.S.M. | D.B.M.(b) |
| 2.0 | 2,130 | 1,490 | 2,210 | 2,230 |
| 2.5 | 2,030 | 1,700 | 2,380 | 2,560 |
| 3.0 | 2,160 | 1,750 | 2,540 | 2,710 |
| 4.0 | 1,810 | 1,720 | 2,170 | 2,230 |

These results show that under appropriate conditions dried buttermilk can be used for penicillin production and will give yields much higher than corn steep and in some cases as high or higher than dried skimmed milk.

It has been found that skimmed milk medium requires the addition of a utilizable source of sulphur for maximal production of penicillin. A number of sulphur compounds have been tested within the standard procedure and of these, thiosulphate regularly produces the highest yields of penicillin.

Over a series of 10 experiments in which thiosulphate and sulphate were compared, the ratio of penicillin yields was $Na_2S_2O_3/Na_2SO_4 = 1.19$.

The utilization of various sulphur compounds for penicillin synthesis is illustrated by the following data:

| Sulphur Compound Used at 200 μg./ml. of Sulphur | Penicillin Yield, units/ml. | | |
|---|---|---|---|
| | Expt. 398Y | 403X | 407X |
| Nil | 730 | 690 | 880 |
| $Na_2S_2O_3$ | 2,000 | 1,930 | 1,810 |
| $Na_2SO_4$ | 1,500 | 1,680 | 1,490 |
| $Na_2SO_3$ | 1,720 | | |
| $Na_2S_2O_4$ | 1,510 | | |
| $Na_2S$ | 870 | | 1,030 |
| Pot. Sulphurata (K.S.) | | 1,630 | 1,540 |
| Cystein | | 1,250 | 1,230 |
| Cystine | | 1,130 | 1,040 |

In order to obtain highest yields of penicillin in skimmed milk medium, it has been found necessary to add precursor to the medium initially and further precursor during the fermentation. For the production of benzyl penicillin, phenylethylamine, phenylacetamide, phenylacetic acid, salts of phenylacetic acid, and N(2-hydroxyethyl) phenylacetamide have been tested in various schedules of addition.

It was found that the addition of about 0.1% phenylacetamide (P.A.D) initially and of a further 0.1 to 0.15% of phenylacetamide or sodium phenyl acetate (P.A.A.) in divided doses during the fermentation gave yields as high as, or higher than, any other schedule tested. The nature of the results obtained is illustrated by the following two experiments:

| Initial P.A.D. | Precursor, Percent P.A.A. | Extra Precursor 4×.025% | Yield, units/ml. |
|---|---|---|---|
| .1 | -------- | -------- | 1,750 |
| .1 | -------- | P.A.D--- | 2,080 |
| .1 | -------- | P.A.A--- | 2,090 |
| -------- | .1 | -------- | 1,250 |
| -------- | .1 | P.A.A--- | 1,870 |

| Initial Precursor, Percent P.A.D. | 0 | Extra Precursor as P.A.A. | | |
|---|---|---|---|---|
| | | 4×.0125 | 4×.025 | 4×.0375 |
| .05 | 1,010 | 1,510 | 2,120 | 2,050 |
| .075 | 1,370 | 2,130 | 2,440 | 2,550 |
| .10 | 1,580 | 2,210 | 2,390 | 2,430 |

When spores of the mould are inoculated directly into standard skimmed milk fermentation medium, growth is slow and irregular but growth from spores in corn steep media is rapid, heavy and regular. Inoculation of corn steep seed culture into skimmed milk fermentation medium produces dense growth of the mould and good penicillin production.

If, however, the volume of corn steep seed inoculum in the standard procedure is reduced below a certain value, a sharp reduction in penicillin yield occurs even though the growth of the mould is normal. This is illustrated in the following experiment in which standard corn steep seed culture was inoculated into standard skimmed milk fermentation medium.

| Corn Steep Seed, Percent inoculum | Penicillin Yield, units/ml. |
|---|---|
| 10 (by volume) | 2,010 |
| 5 (by volume) | 2,130 |
| 2.5 (by volume) | 1,780 |
| 1.25 (by volume) | 1,700 |

When the concentration of the corn steep in the seed medium was varied a similar sharp drop in penicillin yield occurred as shown in the following experiment in which 5% by volume of corn steep seed culture was inoculated into the fermentation medium.

| Percent Corn Steep in Seed Medium | Penicillin Yield, units/ml. |
|---|---|
| 8 (by volume) | 2,190 |
| 6 (by volume) | 2,130 |
| 4 (by volume) | 1,760 |
| 2 (by volume) | 1,790 |
| 3 (by volume) | 1,720 |

These experiments show that to obtain maximum yields of penicillin it is necessary that the seed inoculum shall have been derived from not less than a certain critical quantity of corn steep liquor in relation to the volume of the skimmed milk fermentation medium. In the experiments cited, the critical factor is that the inoculum should be not less than 7% inoculum of a 5% corn steep seed or 5% inoculum of a 6% corn steep seed. It is possible that this critical quantity may vary according to the source of the corn steep since other evidence indicates that the phenomenon may be due at least in part to transfer of trace elements in the seed culture. It is therefore also possible that some corn steeps may not provide enough trace elements and, in such cases, trace elements would have to be added to the fermentation medium in the manner indicated hereinafter.

When spores of the mould are inoculated into a medium containing dried skimmed milk and lactose, growth is slow and irregular, but if to such medium is added 1% to 3% by weight of a readily utilizable carbohydrate such as glucose, sucrose or dextrin, growth from spores becomes rapid and heavy.

A seed medium containing 3% dried skimmed milk, 2% sucrose and 0.1% $Na_2SO_4$ regularly gave rapid growth from spores and this medium will be referred to as standard skimmed milk seed medium. When cultures grown in this standard seed medium were used to inoculate standard skimmed milk fermentation medium, penicillin yields in the range 1000 to 1400 units/ml. were obtained in a number of experiments compared with yields of about 2100 units/ml. from the standard procedure using inoculum grown in corn steep seed medium.

The relatively low yields of penicillin obtained by inoculating seed culture grown in standard skimmed milk seed medium into standard skimmed milk fermentation medium can be increased by adding to the fermentation medium appropriate concentrations of salts of iron and/or copper and/or a metal chelating agent such as ethylene diamine tetracetic acid or a salt thereof. In this connection, iron may be added at a concentration of between 2 and 20 $\mu$g./ml. while the copper may be added at a concentration of between 0.1 and 1.0 $\mu$g./ml.

The increase in yield obtained by adding iron alone or copper alone varied, but when both iron and copper were added to the fermentation medium the yield of penicillin was regularly as high as, or higher than, that from the standard procedure using a corn steep seed culture. When the disodium salt of ethylene diamine tetracetic acid was added to the fermentation in addition to iron and copper, a further increase was obtained which, however, was not regularly reproducible. The optimum concentrations of iron and copper to be added to the fermentation medium were not well defined, but appeared to be about 10 $\mu$g./ml. of iron and about 0.3 to 1.0 $\mu$g./ml. of copper.

The effect of adding iron, copper and the disodium salt of ethylene diamine tetracetic acid (E.D.T.A.) to the fermentation medium is illustrated in results from the following two experiments, in which the iron was added as ferrous ammonium sulphate and the copper as copper sulphate. Dried skimmed milk seed medium was inoculated into dried skimmed milk fermentation medium.

(i)

| Metals Added, $\mu$g./ml. | | Penicillin Yield, units/ml. | |
|---|---|---|---|
| Fe | Cu | No. E.D.T.A. | E.D.T.A., 0.05% |
| ----- | ----- | 1,310 | 1,820 |
| 10 | ----- | 1,520 | 2,040 |
| ----- | 0.3 | 1,630 | 1,910 |
| ----- | 1.0 | 1,410 | 1,780 |
| 10 | 0.3 | 2,010 | 2,250 |
| 10 | 1.0 | 2,220 | 2,320 |

(ii)

| Fe | Cu | No. E.D.T.A. | E.D.T.A., 0.05% |
|---|---|---|---|
| ----- | ----- | 1,230 | ----- |
| 3 | ----- | 1,580 | 2,050 |
| 10 | ----- | 1,650 | 1,970 |
| 30 | ----- | 1,490 | 2,040 |
| ----- | 1 | 1,040 | 1,420 |
| ----- | 3 | 950 | 1,330 |
| ----- | 10 | ----- | 620 |
| 10 | 1 | 2,430 | 2,380 |
| 10 | 3 | 2,310 | 2,250 |
| 10 | 10 | 2,350 | 2,510 |
| 30 | 1 | 2,090 | 2,140 |
| 30 | 3 | 2,140 | 2,290 |
| 30 | 10 | 2,260 | 2,220 |

In experiment (i) control flasks in which the dried skimmed milk fermentation medium without the addition of E.D.T.A. was inoculated with the standard corn steep seed culture gave a penicillin yield of 2170 units/ml.

while in experiment (ii) the corresponding yield was 2110 units/ml.

Addition of iron, copper and the disodium salt of ethylene diamine tetracetic acid in various combinations to standard dried skimmed milk fermentation medium inoculated with corn steep seed culture gave increases in yield which, however, were not regularly reproducible. The nature of the effects obtained is illustrated by the results of the following experiment in which corn steep seed was inoculated into dried skimmed milk fermentation medium.

| Metals μg./ml. | | Penicillin Yield, units/ml. | |
|---|---|---|---|
| Fe | Cu | No. E.D.T.A. | E.D.T.A., 0.05% |
| ------ | ------ | 2,130 | 2,020 |
| 10 | ------ | 2,210 | 2,380 |
| ------ | 0.3 | 2,060 | 2,480 |
| ------ | 1.0 | 1,950 | 2,190 |
| 10 | 0.3 | 2,400 | 2,410 |
| 10 | 1.0 | 2,200 | 2,670 |

The use of a seed medium based on corn steep liquor has been described and also the use of a seed medium based on dried skimmed milk. Seed media based on other nutrient materials may also be used provided they give rapid and abundant growth of the mould. For instance we have also used a seed medium based on the material known as whale solubles.

It will thus be apparent to those skilled in the art that this invention provides a distinctly new approach to the problem of large scale production of penicillin in that, for the first time, skimmed milk or a similar product has been successfully used. In particular, it has been shown that dried skimmed milk, which in addition to being readily available, substantially constant in composition and convenient for transport and storage, can be made to give yields of penicillin as high as, or substantially higher, than those obtained from corn steep medium using the same strain of mould in the same fermentation apparatus and under the same conditions.

The claims defining the invention are as follows:

1. A process for the production of penicillin comprising growing penicillin-producing mould under submerged culture conditions in a fermentation medium in which all of the proteinaceous material is derived directly from skimmed milk, and adding to said medium a utilizable carbohydrate, a penicillin precursor selected from the group consisting of phenylethylamine, phenylacetamide, phenylacetic acid, and N(2 hydroxyethyl) phenylacetamide, and a further source of sulphur comprising a member of the group consisting of a soluble thiosulphate, a soluble sulphate, a soluble sulphite, a soluble hydrosulphite, a soluble polysulphide, cystein, cystine, and a soluble sulphide, and inoculating said fermentation medium with a seed culture grown on a medium based on skimmed milk.

2. A process according to claim 1, wherein the fermentation medium is inoculated with a seed culture grown on a skimmed milk medium containing about 3% dried skimmed milk.

3. A process according to claim 2, in which the seed culture medium contains a readily utilizable carbohydrate.

4. A process according to claim 3, in which the readily utilizable carbohydrate is glucose.

5. A process according to claim 3, in which the readily utilizable carbohydrate is sucrose.

6. A process according to claim 3, in which the readily utilizable carbohydrate is dextrin.

7. A process according to claim 3, in which the readily utilizable carbohydrate is present in said seed culture medium in the proportion of about 1% to 3% by weight.

8. A process according to claim 2, in which the seed culture medium has added thereto a further source of sulphur utilizable by the mould.

9. A process according to claim 8, in which said added source of sulphur is soluble thiosulphate.

10. A process according to claim 1, in which the fermentation medium contains dried skimmed milk.

11. A process according to claim 10, in which the dried skimmed milk is present in the fermentation medium in the proportion of about 3% by weight.

12. A process according to claim 10, in which the fermentation medium contains added lactose.

13. A process according to claim 12, in which lactose is present in the fermentation medium in a total concentration of about 5% by weight.

14. A process according to claim 1 in which said precursor is added to the fermentation medium initially and further amounts of said precursor are added during fermentation.

15. A process according to claim 1, further comprising adding a source of iron to the fermentation medium.

16. A process according to claim 15, in which the source of iron comprises ferrous ammonium sulphate.

17. A process according to claim 15, in which the iron is added so as to be present in the fermentation medium at a concentration of about 2 to 20 μg./ml.

18. A process according to claim 1, further comprising adding a source of copper to the fermention medium.

19. A process according to claim 18, in which the source of copper comprises copper sulphate.

20. A process according to claim 18, in which the copper is added so as to be present in the fermentation medium at a concentration of about 0.1 to 1.0 μg./ml.

21. A process according to claim 1, further comprising adding to the fermentation medium a metal chelating agent selected from the group consisting of ethylene diamine tetra-acetic acid and a salt thereof.

22. A process according to claim 1, in which the fermentation medium contains non-dried skimmed milk.

23. A process according to claim 1, in which the fermentation medium contains butter milk.

References Cited in the file of this patent

UNITED STATES PATENTS

| | | |
|---|---|---|
| 2,437,918 | McCormack | Mar. 16, 1948 |
| 2,442,141 | Moyer | May 25, 1948 |
| 2,609,327 | Kolachov et al. | Sept. 2, 1952 |
| 2,698,274 | Christensen et al. | Dec. 28, 1954 |
| 2,761,812 | Hockenhull et al. | Sept. 4, 1956 |

OTHER REFERENCES

Winton: Structure and Composition of Foods, vol. III, John Wiley & Sons, 1937, pages 151, 152, 195 and 196.

Moyer et al.: Jour. Bact., 1946, pages 57–78.

Gaden: Chemical Engineering, vol. 63, No. 4, April 1956, page 163.